G. E. LUNDBERG.
LUBRICANT RETAINER.
APPLICATION FILED DEC. 8, 1915.
1,182,392.
Patented May 9, 1916.
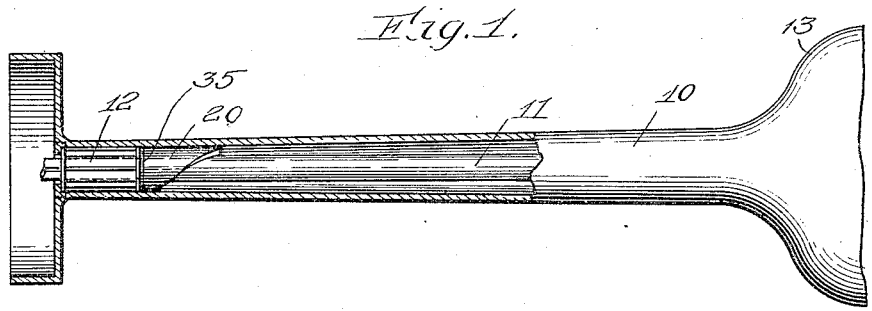
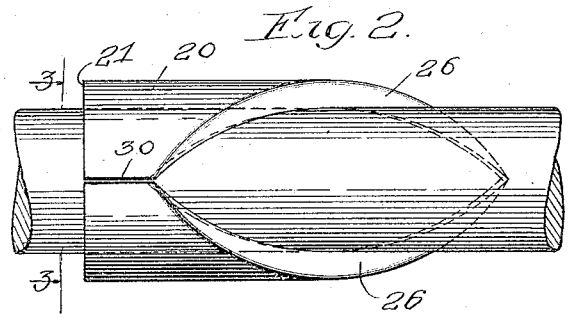 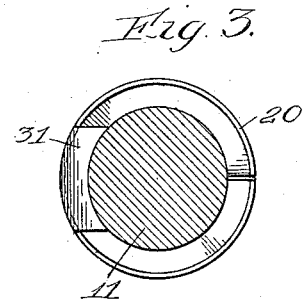
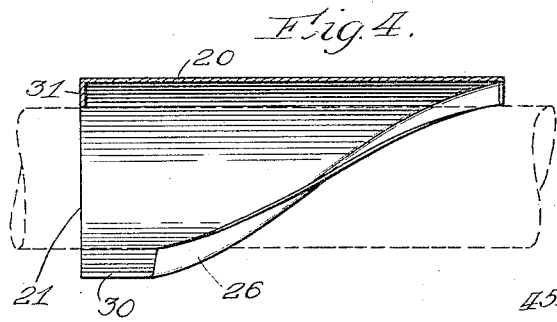
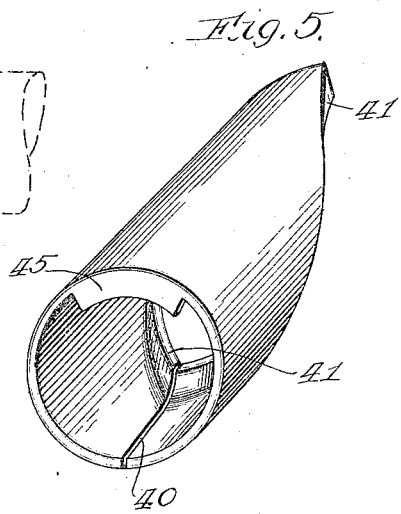
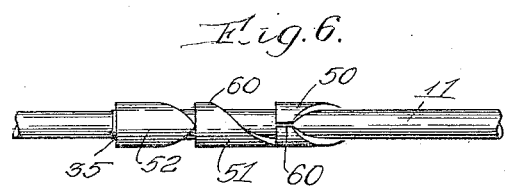
Witness:
G. L. Farmington
Inventor,
Gustave E. Lundberg
By Hirschl & Hirschl
Attys.

UNITED STATES PATENT OFFICE.

GUSTAVE E. LUNDBERG, OF KEWANEE, ILLINOIS.

LUBRICANT-RETAINER.

1,182,392.  Specification of Letters Patent.  Patented May 9, 1916.

Application filed December 8, 1915. Serial No. 65,795.

*To all whom it may concern:*

Be it known that I, GUSTAVE E. LUNDBERG, a citizen of the United States, residing at 726 Henry street, in Kewanee, county of Henry, and State of Illinois, have invented new and useful Improvements in Lubricant-Retainers, of which the following is a specification.

This invention relates to lubricant retaining devices more especially adapted for use in connection with automobiles. In such machines as they are ordinarily constructed, the rear axle is inclosed in a non-rotative housing having an enlargement at its center for containing the differential mechanism, and into such housing is introduced lubricant which is usually in the form of a heavy semi-fluid oil or grease. It is well known also that this lubricant has a tendency to work out to the two ends of the axle housing and escape at the hubs of the wheels where it gets on the brake drums and causes difficulty with the braking. In order to prevent such escape of lubricant and to confine the latter in the center part of the axle housing this invention contemplates a device adapted to be detachably placed upon the rotative axle to act in the rotation of the latter, in either direction, to force the lubricant toward the center of the housing. Such a device is shown in the accompanying drawings in which—

Figure 1 is a view showing, partly in elevation and partly in section, a portion of an axle housing with a rotative axle shaft journaled therein, and one of my improved lubricant retaining devices in place. Fig. 2 is a view in elevation showing a portion of the axle shaft and the lubricant retaining device on a larger scale. Fig. 3 is a vertical section on the line 3—3 of Fig. 2. Fig. 4 is an axial section through the lubricant retaining device detached from the axle shaft. Fig. 5 is a view in perspective showing a modified form of the lubricant retaining device. Fig. 6 is a view in elevation showing, as a separate modification, three devices all of the same kind in use upon a single axle shaft.

As shown in said drawings, in Figs. 1 to 4 inclusive, 10 indicates a non-rotative axle housing, and 11 indicates a rotative axle shaft journaled therein, with a bearing member, such as a roller bearing 12, interposed between the outer end of the axle shaft and the axle tube or housing; these parts being shown in well known form and their particular design and construction constituting no part of the present invention. At its center part the housing 10 is enlarged, as shown at 13, to inclose the differential mechanism, as is also well understood; and ordinarily the enlarged part 13 of the housing is supplied with lubricant, which it is desirable to confine therein and prevent from escaping through the two outer ends of the tubular part 10. For the purpose of preventing such escape of lubricant I have provided a sleeve 20 adapted to encircle and fit snugly upon the axle shaft 11 and to also fit fairly closely within the bore of the axle tube 10, as shown in Fig. 1. This sleeve is made in the form of a short cylinder with its outer end 21 cut off in a radial plane and its inner end cut off diagonally so as to form two spiral edges 26, 26 in the form of threads about the shaft, one thread necessarily being a right-hand thread and the other a left-hand thread. The device as here shown is preferably made of sheet metal rolled into a cylinder of somewhat greater diameter than the diameter of the axle shaft 11, and when thus formed the two spiral edges 26 are bent or flanged radially inward (as best shown in Fig. 4) so that they will meet the surface of the shaft and fit closely and snugly around it. The two meeting edges of the cylindric part of the sleeve are left unjoined, so that the device can be sprung open a small amount to aid in fitting it in place; the opening between such edges when the device is thus sprung open being shown in Fig. 2 at 30. At the end of the sleeve 21 there is also provided an extension or projection 31 which is also bent or flanged radially inward, such bent portion having its inner edge cut and shaped in the arc of a circle to likewise fit closely around the axle shaft 11, so that the device will grasp the shaft firmly at both ends.

In order to fit the device in place it is necessary only to remove the wheel and the bearing member 12 and then slip the device into place over the end of the shaft 11 and push it inward as far as desired. In subsequent operation the rotation of the shaft in either direction will cause the leading thread of the device to force or impel the lubricant toward the enlarged part, 13, of the housing; and if the re-action of the thrust upon the lubricant slides the sleeve 20 endwise upon the shaft 11 and thus moves it outward, its movement will finally be arrested when it comes into contact with the bearing member 12. Such a bearing member is ordinarily made with a rotative inner part and a non-rotative outer part and if it is necessary to prevent the sleeve 20 from coming into engagement with the non-rotative outer part of the bearing member an ordinary washer may be interposed between the end of the sleeve and the rotative center part of the bearing member, so that the thrust of the sleeve will come against such rotative part and the sleeve will rotate with the shaft; such a washer being indicated at 35.

In Fig. 5 is shown a device similar in all respects to that above described except that instead of being made of sheet metal curved into cylindric form, the device is made by casting the sleeve in one integral part, comprising a cylindric sleeve split through, as indicated at 40, and having right and left spiral edges with radial flanges 41, 41, and an integral radial flange 45 at its other end; the device being fitted in place in the same manner as above described and its operation being the same in all respects.

In Fig. 6 is illustrated an arrangement with three of the devices in use upon one axle shaft, each of these three devices being constructed in one of the two manners above described, and the three devices simply being put in place end to end so that lubricant escaping past the innermost one, 50, will be forced back by the second one 51, and in turn by the third one 52 if it has escaped that far. In this case the devices 50 and 51 may be made with the openings 60 where their edges come together somewhat wider than the openings 30 above described, so that lubricant can be forced back through these openings by the respective impelling devices situated beyond them.

Although in the foregoing illustrations only one side of the axle housing and one axle shaft are illustrated, it is well understood that the opposite side of the axle housing and the other axle shaft are symmetrical to these and the other shaft may be fitted with a lubricant retaining device, or devices, in exactly the same manner as above described.

I claim as my invention:

1. The combination with a rotative axle shaft and a housing therefor, of a lubricant retaining device encircling such shaft, such device having a portion thereof in the form of a right-hand thread and another portion thereof in the form of a left-hand thread.

2. The combination with a rotative shaft and a housing for such shaft, of a lubricant retaining device comprising a sleeve upon such shaft, such sleeve having portions thereof in the form of right and left hand threads.

3. The combination with a rotative shaft and a housing therefor, of a lubricant retaining device comprising a sleeve adapted to be sprung into place surrounding such shaft, such sleeve having spiral edges in the form respectively of right-hand and left-hand threads.

In witness whereof, I have hereunto subscribed my name this 4th day of December, 1915.

GUSTAVE E. LUNDBERG.

Copies of this patent may be obtained for five cents each, by addressing the "Commissioner of Patents. Washington, D. C."